US012776684B2

(12) United States Patent
Michel et al.

(10) Patent No.: US 12,776,684 B2
(45) Date of Patent: Oct. 27, 2026

(54) STATOR ARRANGEMENT WITH A COOLANT SYSTEM AND ELECTRIC MACHINE WITH THE STATOR ARRANGEMENT

(71) Applicant: ZF Friedrichshafen AG, Friedrichshafen (DE)

(72) Inventors: Christian Michel, Ravensburg (DE); Uwe Firzlaff, Uhldingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 319 days.

(21) Appl. No.: 18/187,528

(22) Filed: Mar. 21, 2023

(65) Prior Publication Data

US 2023/0299641 A1 Sep. 21, 2023

(30) Foreign Application Priority Data

Mar. 21, 2022 (DE) ........................ 102022202749.3

(51) Int. Cl.
*H02K 9/08* (2006.01)

(52) U.S. Cl.
CPC ..................................... *H02K 9/08* (2013.01)

(58) Field of Classification Search
CPC .......... H02K 9/193; H02K 9/19; H02K 5/203; H02K 5/20
USPC ..................................................... 310/54, 58
See application file for complete search history.

(56) References Cited

U.S. PATENT DOCUMENTS

| | | | | | |
|---|---|---|---|---|---|
| 3,629,627 | A * | 12/1971 | Dafler | H02K 9/19 310/44 |
| 2016/0131245 | A1 | 5/2016 | Imai et al. | |
| 2018/0076694 | A1* | 3/2018 | Aronovich | H02K 15/12 |
| 2019/0006908 | A1* | 1/2019 | Scharlach | H02K 5/203 |
| 2019/0006914 | A1* | 1/2019 | Graves | F16H 57/0483 |
| 2019/0123612 | A1* | 4/2019 | Weber | H02K 1/20 |
| 2024/0333103 | A1* | 10/2024 | Weber | F16H 57/0443 |

(Continued)

FOREIGN PATENT DOCUMENTS

| | | | | |
|---|---|---|---|---|
| DE | 102012022452 A1 * | 5/2014 | | H02K 1/20 |
| DE | 10 2016 211 226 B3 | 6/2017 | | |
| DE | 10 2018 121 203 A1 | 3/2020 | | |

(Continued)

OTHER PUBLICATIONS

Machine Translation DE 102012022452 (Year: 2014).*

(Continued)

*Primary Examiner* — Christopher M Koehler
(74) *Attorney, Agent, or Firm* — Crowell & Moring LLP

(57) ABSTRACT

A stator assembly for an electric machine may have a stator including a stator core and a plurality of stator windings, which has a cooling system for cooling the stator, where the cooling system includes a cooling shell 10 encompassing the stator core, which is thermally coupled to the stator core, where the cooling system has a supply line connected to the cooling shell at the intake end and a return line connected to the cooling shell at the outlet end, where the cooling system has at least one coolant pump and one coolant container, where the coolant pump is connected to the supply line in the flow path between the coolant container and the cooling shell in order to supply coolant to the cooling shell through the supply line.

14 Claims, 3 Drawing Sheets

(56) References Cited

U.S. PATENT DOCUMENTS

2024/0333104 A1* 10/2024 Greiter ................ F16H 57/0476

FOREIGN PATENT DOCUMENTS

| | | | | |
|---|---|---|---|---|
| DE | 102020007735 A1 * | 6/2022 | | |
| DE | 102021128068 A1 * | 5/2023 | ............. | H02K 9/197 |
| JP | 2016-111918 A | 6/2016 | | |

OTHER PUBLICATIONS

Machine Translation DE 102020007735 (Year: 2022).*
C. Liu et al., "Estimation of Oil Spray Cooling Heat Transfer Coefficients on Hairpin Windings With Reduced-Parameter Models," in IEEE Transactions on Transportation Electrification, vol. 7, No. 2, pp. 793-803, Jun. 2021 (Year: 2021).*
Office Action dated Jan. 19, 2023 for German Patent Application No. 10 2022 202 749.3 note: pp. 1 and 2 are English language Explanations to Section C. Result of Determination Document (12 pp.).

* cited by examiner

STATOR ARRANGEMENT WITH A COOLANT SYSTEM AND ELECTRIC MACHINE WITH THE STATOR ARRANGEMENT

RELATED APPLICATION

This application claims the benefit of, and priority to, German Patent Application DE 10 2022 202 749.3, filed Mar. 21, 2022, which is hereby incorporated by reference herein in its entirety.

TECHNICAL FIELD

The invention relates to a stator assembly for an electric machine that has the features in the preamble of claim 1. The invention also relates to an electric machine that has the stator assembly.

BACKGROUND AND SUMMARY

Thermal losses must be discharged when operating electric machines, with the stator normally being cooled by a cooling shell and the rotor being cooled by a cooling system comprising hollow shafts. To obtain a greater efficiency, the winding head can also be cooled. In the prior art, the cooling systems for the stator and winding head are supplied with coolant through two separate coolant circuits.

DE 10 2018 121 203 A1 discloses a cooling device that contains at least one first cooling channel element, which has at least one first cooling channel, and at least one second cooling channel element that has at least one second cooling channel, in which the first and second cooling channel elements each basically encircle a central axis of the cooling device and are concentric to one another. The second cooling channel element is placed in relation to the first cooling channel element around the central axis such that the first and second cooling channels overlap one another, at least in part, along the radial direction of the first and second cooling channel elements.

The object of the invention is to create a stator assembly of the type specified above, which has an improved cooling system.

This object is achieved according to the invention by a stator assembly that has the features of claim 1, and an electric machine that has the features of claim 13. Advantageous embodiments can be derived from the dependent claims, the drawings and/or the description.

The subject matter of the invention is a stator assembly that is designed and/or suitable for an electric machine. The stator assembly contains a stator, substantially formed by a stator core and numerous stator windings supported on the stator core. The stator preferably creates a magnetic field that interacts with a rotor that rotates in relation to the stator. In particular, the stator forms the stationary part of the electric machine. The stator core is preferably a laminated metal core comprised of numerous laminated layers running in the axial direction in relation to a main axis of the electric machine, in particular a rotational axis of the rotor.

The electric machine can preferably be an internal rotor-type machine in which the rotor is located radially inside the stator. Alternatively, the electric machine can be an external rotor-type machine, in which the rotor is located outside the stator. In particular, the stator core in an internal rotor-type machine contains numerous stator teeth directed radially inward, around each of which a stator winding is wound.

The stator assembly contains a cooling system that is designed and/or suitable for cooling the stator. The cooling system has a cooling shell encompassing the stator core, which is thermally coupled to the stator core. In particular, the cooling shell is used for liquid cooling comprising a coolant flowing through the cooling shell. The coolant can be in the form of a liquid, e.g. water or oil. In particular, the cooling shell cools the stator core over its entire structural width.

The cooling system has supply line connected to the intake on the cooling shell and a return line connected to the outlet on the cooling shell. In particular, the supply line supplies coolant to the cooling shell and the coolant is removed from the cooling shell through the return line. The coolant preferably flows from the supply line through the cooling shell to the return line. The cooling system is particularly preferably liquid-tight and/or pressure-tight, in particular between the supply line and the return line. The supply line and/or return line can be connected directly to the cooling shell. Preferably, the supply line and/or return line are connected to the cooling shell by means of at least one additional flow-through component. The supply line and/or return line can be formed by one or more separate lines, e.g. tubes, hoses, etc.

The cooling system contains at least, or precisely, one coolant pump and one coolant container. In particular, the coolant pump is designed to convey coolant from the coolant container to the cooling shell through the supply line, and/or circulate the coolant in the cooling system. The coolant container can be an open container, e.g. a basin, or a closed container, e.g. a tank. A coolant sump is preferably formed in the coolant container, from which the coolant pump draws in coolant. The coolant pump is placed in the flow path between the coolant container and the cooling shell such that it can supply coolant to the cooling shell through the supply line. In other words, the coolant pump is connected to the supply line in the flow path between the coolant container and the cooling shell.

The return line is connected in the flow path between the coolant container and the coolant pump in the framework of the invention, such that the coolant pump can be and/or is supplied with coolant from the return line. In particular, by returning the coolant to the supply line, a closed coolant circuit is formed, which can also be supplied with coolant from the coolant container as needed. The return line can basically be connected to the supply line in the flow path anywhere between the coolant container and the coolant pump. Preferably, the return line is connected at a point where the coolant pump creates a suction.

The invention is based on the idea that electric machines that are cooled with a coolant fluid are normally supplied with the coolant from the side or in the middle of the stator, and the coolant is returned to the coolant container inside the electric machine, in particular inside the machine chamber in the electric machine, in order to cool the rotor and/or stator windings. As a result, if too much coolant enters the machine chamber in the electric machine, drag torques may be formed, in particular if the coolant gets into the air gap between the rotor and the stator. There is also the disadvantage that when the coolant returns through the machine chamber, insufficient coolant may circulate through the cooling system, such that the stator may not be cooled adequately.

With a targeted return of the coolant to the supply line, a cooling system is proposed that is distinguished by a reduced amount of coolant in the machine chamber, such that drag torques and splashing losses can be significantly reduced in the electric machine. This results in a significantly more efficient electric machine. Another advantage is that by supplying coolant to the coolant pump from the return line, the cooling shell is always supplied with sufficient coolant. This significantly increases the certainty that that the cooling system will always be supplied with sufficient coolant. As a result of the closed circuit, a cooling system is proposed in which coolant is reliably supplied to the cooling shell, regardless of the situation, i.e. when travelling uphill or downhill.

In a concrete embodiment of the invention, a supply flow path runs from the coolant container through the supply line to an intake point in the cooling shell, and a return flow path runs from an output point in the cooling shell through the return line and ends in the supply flow path. In particular, the supply flow path and return flow path form a combined flow path along which heat is removed from the stator. The coolant flows along the supply flow path from the coolant container through the coolant pump and the supply line to the intake in the coolant shell and along the return flow path from the outlet in the cooling shell through the return line back to the supply flow path. The coolant preferably circulates along the flow path when the coolant pump is operating, and at least part of the coolant is returned to the cooling shell through the return line. In other words, the overall volume of coolant in the supply flow path comprises some coolant from the return line and potentially some coolant from the coolant container. This results in the advantage that by recirculating the coolant, the amount of coolant inside the electric machine is reduced, and the amount of coolant conveyed from the coolant container is kept to a minimum.

In a first embodiment, the return line opens into the coolant pump or into a region directly in front of the coolant pump, where coolant is drawn in. In particular by connecting the return line to a point where the pump draws in coolant, the coolant pump is able to form a suction. This suction is understood to be a returning of the coolant to the coolant pump where it draws in coolant, in order to generate a fluid pressure at this point. The conveyance pressure at this point in the coolant pump is preferably the fluid pressure. The return line preferably enters directly into a housing for the coolant pump. Alternatively, the return line can be connected to the supply line directly in front of the coolant pump, in particular where the coolant pump draws in fluid. By way of example, the coolant pump is a rotary vane pump. By returning the coolant to the point where the coolant pump draws in coolant, the pump efficiency can be significantly increased. Furthermore, the coolant pump can be smaller and thus less expensive.

In an alternative embodiment, the cooling system contains a coolant tank between the coolant container and the coolant pump, into which the return line opens. The coolant pump is preferably designed to supply the cooling shell through the supply line with a coolant from the coolant tank. In particular, the coolant tank is connected in the flow path to the coolant pump or the cooling shell through the supply line, and to the coolant container through a connecting line. In particular, the coolant tank has a coolant intake and a coolant outlet, and the return line and connecting line form the coolant intake and supply line forms the coolant outlet. In other words, the coolant tank is connected to the coolant container and the return line at the intake end and to the coolant pump at the outlet end. The coolant tank can be closed and/or liquid-tight container. In particular, the coolant tank forms a pressure chamber, in which the coolant conveyed into the coolant tank is subjected to a fluid pressure. By returning the coolant to the coolant tank, the coolant is subjected to a pressure, such that it cannot slosh around, thus increasing the reliability of the cooling system. Furthermore, a reservoir is formed by the coolant tank that ensures a sufficient amount of coolant for the coolant pump.

In one development, the cooling system contains an additional coolant pump that is located in the flow path between the coolant container and the coolant tank in order to supply coolant to the coolant tank from the coolant container. In particular, the second coolant pump evacuates coolant from the machine chamber and/or gear chamber in a dry sump lubrication of the electric machine. By way of example, the at least one additional coolant pump is a bilge pump. The invention is based on the idea that with electric machines that make use of dry sump lubrication of the machine chamber and gear chamber, in particular a gearset chamber, using bilge pumps, these chambers are evacuated into separate fluid tanks. It is therefore one consideration of the invention to use this separate fluid tank as the coolant tank. By returning the coolant into the coolant tank, the amount of coolant that needs to be conveyed by the second coolant pump can be significantly reduced, such that the coolant pump can be operated significantly more efficiently, and it can also be smaller and therefore less expensive.

In another embodiment, the cooling shell is formed by numerous cooling channels extending in the axial direction of the stator core. By way of example, cooling channels can be formed by numerous channels that run in the same direction and/or are parallel to one another in the axial direction, which preferably extend over the entire axial width of the stator core and/or pass through it axially. The cooling channels can be axial bores, recesses, ridges, etc., which can be formed on a separate cooling shell or directly in the stator core itself.

According to this, the cooling channels are connected within the flow path to the supply line at a first axial end surface of the stator core by a first annular channel, and to the return line at a second axial end surface of the stator core by a second annular channel. In particular, the first and/or second annular channels ensure an even supply and/or distribution of the coolant, in particular around the circumference. In particular, the first and second annular channels are coaxial and/or concentric to the main axis and/or stator core. The first and second annular channels particularly preferably encircle the main axis. In particular, the coolant is supplied at the first axial end surface through the first annular channel, and then removed at the second axial end surface through the second annular channel. In other words, the flow path runs from the first annular channel through the cooling channels to the second annular channel. The supply line and/or return line can be connected to the respective annular channels radially or axially. A simple and space-saving connection to the supply line and return line is therefore proposed, which also results in an even flow through the cooling shell, in particular the cooling channels therein.

In another embodiment, the cooling channels each have a coolant inlet and a coolant outlet, in which the coolant inlets are all connected to one another in the flow path at the first axial end surface by the first annular channel, and the coolant outlets are all connected to one another in the flow path at the second axial end surface by the second annular channel. In particular, the flow path therefore runs from the intake end, or the coolant inlet to the outlet end, or coolant outlet, in the axial direction in relation to the main axis. In other words, the cooling channels each extend from the associated coolant inlet to the associated coolant outlet in the axial direction in relation to the main axis, and/or parallel to one another. The cooling channels preferably each open into the first annular channel at the first axial end surface and into the second annular channel at the second axial end surface. This results in a cooling shell that is distinguished by a unidirectional flow of the coolant in the axial direction in relation to the main axis, or from the intake end to the outlet end. This results in a particularly uniform flow through the stator core, in which the collective connecting of the cooling channels through the annular channels results in a particularly even flow.

In another embodiment, the first annular channel is formed by a first coolant guide ring and the second annular channel is formed by a second coolant guide ring. The first coolant guide ring is supported on the first axial end surface on the stator core, and the second coolant guide ring is formed on the second axial end surface on the stator core. In particular, the first and second coolant guide rings are coaxial to one another or to the stator core with respect to the main axis. The two coolant guide rings are preferably identical. The first and/or second coolant guide rings can be connected to the stator in a form-fitting and/or force-fitting and/or material bonded manner. In particular, the first and/or second coolant guide rings are supported on the stator in a fluid-tight and/or pressure-tight manner. In the simplest design, the first and second coolant guide rings form preferably cylindrical rings encircling the main axis, which delimit the respective annular channels in the radial direction. In an alternative design, the first and/or second coolant guide rings have an L-shaped cross section, such that the respective annular channels are delimited in both the radial and axial directions by the associated coolant guide rings. In another alternative design, the first and/or second coolant guide rings can have a C-shaped or U-shaped cross section, such that the respective annular channels are delimited on both sides in the radial direction and in the axial direction by the associated coolant guide rings. In particular, the supply line can be connected directly to the first coolant guide ring and/or the return line can be connected directly to the second coolant guide ring. The first and second coolant guide rings can have corresponding connecting interfaces for this. The connecting interfaces can be formed by a bore or a nozzle. By way of example, the first and second coolant guide rings can be made of plastic.

In another embodiment the supply line and return line are each connected in the flow path to the cooling shell, preferably with to the associated annular channels, at an upper surface of the stator core when the stator assembly is installed. In particular, the supply line and/or return line are connected at the highest points of the respective annular channels, seen in the circumferential direction. Put simply, the supply line and/or return line are connected at more or less the 12 o'clock position on the respective annular channels seen in the circumferential direction. "More or less" is understood to mean that the connections of the supply line and return line lie somewhere between the 10 o'clock and 2 o'clock positions, in particular between the 11 o'clock and 1 o'clock positions. The supply line and return line are preferably connected opposite one another to the respective annular channels in relation to the main axis. By connecting the supply line and return line at the highest point, it is ensured that the cooling system, in particular the cooling shell, is always filled with coolant, and thus an optimal flow through the cooling shell is obtained.

In another embodiment, the stator assembly has a housing in which the supply line and/or return line are formed. In particular, the housing contains the stator and the rotors, and the stator is stationary inside the housing, in particular in the machine chamber, and/or permanently connected to the housing. The supply line is preferably formed in the housing such that it opens into the first annular channel. The return line is preferably formed in the housing such that it opens into the second annular channel. The housing be a cast metal housing in which the supply line and/or return line are molded into the housing, formed in particular by empty spaces formed therein. The supply line and/or return line can also be formed by the removal of material in the housing, e.g. through drilling. The cooling shell is preferably formed radially between the stator core and the housing. The first and/or second annular channels and/or the cooling channels are delimited at least in the radial direction in relation to the main axis by an inner circumference of the housing. In particular, the first and/or second annular channels are delimited in the radial direction on one side by the housing and on the other side by the coolant guide ring. A stator assembly is therefore proposed that is distinguished by a particularly compact and space-saving construction.

In another embodiment, the stator windings form at least, or precisely, one winding head adjoining the stator core in the axial direction, and the cooling system is designed and/or suitable for cooling the winding heads. In particular, the stator windings form winding heads adjoining the stator core on both sides in the axial direction. The cooling system is preferably also designed as a winding head cooling system, and the supply line and/or return line are designed to provide a portion of the coolant to the winding heads. The first and/or second annular channels can also be designed such that a portion of the coolant is diverted to the at least one winding head in order to cool it. In particular, the winding head cooling is connected in series upstream and/or downstream of the cooling shell. A particularly efficient cooling of the stator is therefore proposed in which a portion of the coolant can be used for cooling the winding heads, and the rest of the coolant is returned through the return line.

In one development, the cooling system is designed to cool the at least one winding head with a minimal amount of coolant. In particular, a minimal amount of coolant is understood to involve a cooling of the at least one winding head as needed, which consumes and/or requires a minimal amount of coolant. Preferably, less than 40%, preferably less than 30%, particularly less than 20% of the coolant flow is used for cooling the winding head. A cooling system is therefore proposed that is distinguished by a cooling of the winding heads as needed, in which the coolant in the motor housing is also reduced to the minimum.

In another embodiment, the first and/or second coolant guide rings have holes distributed along the circumference, which are designed and/or suitable for the winding head cooling. A winding head shower is preferably formed by the holes. A portion of the coolant is conveyed through the holes toward the winding head for this. In particular, the holes are spaced apart evenly along the circumference. The size of the holes is preferably such that no more than 20%, preferably no more than 15%, in particular no more than 10% of the volumetric flow in each of the coolant guide rings is diverted for winding head cooling. By way of example, the holes can each form a microchannel, which has a cross section at the narrowest point of less than 2 mm2, preferably less than 1 mm2, particularly less than 0.5 mm2. In particular, the holes are formed in the respective coolant guide rings such that the coolant is or can be conveyed directly onto the at least one winding head. A stator assembly is therefore proposed that is distinguished by a particularly efficient cooling of the winding heads.

In another embodiment, the first and/or second coolant guide rings are located on a radially outer surface of the at least one winding head, and the holes forming the winding head shower are directed radially toward the winding head. In particular, the first coolant guide ring forms a winding head shower for the first winding head, and the second coolant guide ring forms a winding head shower for the second winding head. In particular, the first and/or second annular channels are subjected to a liquid pressure of, e.g., more than 5 bar, in particular more than 10 bar, particularly more than 50 bar. By placing the coolant guide rings on the radially outer surface of the winding heads, a particularly efficient and reliable cooling of the winding heads can be obtained.

The invention also relates to an electric machine that contains the stator assembly described above. In particular, the electric machine is designed and/or suitable for powering a vehicle. The electric machine preferably has a rotor, and the rotor is located, or can rotate, inside the stator. The electric machine is particularly designed as a so-called internal rotor-type machine.

BRIEF DESCRIPTION OF THE DRAWINGS

Further features, advantages, and effects of the invention can be derived from the following description of preferred exemplary embodiments. Therein.

DETAILED DESCRIPTION

Figure 1:
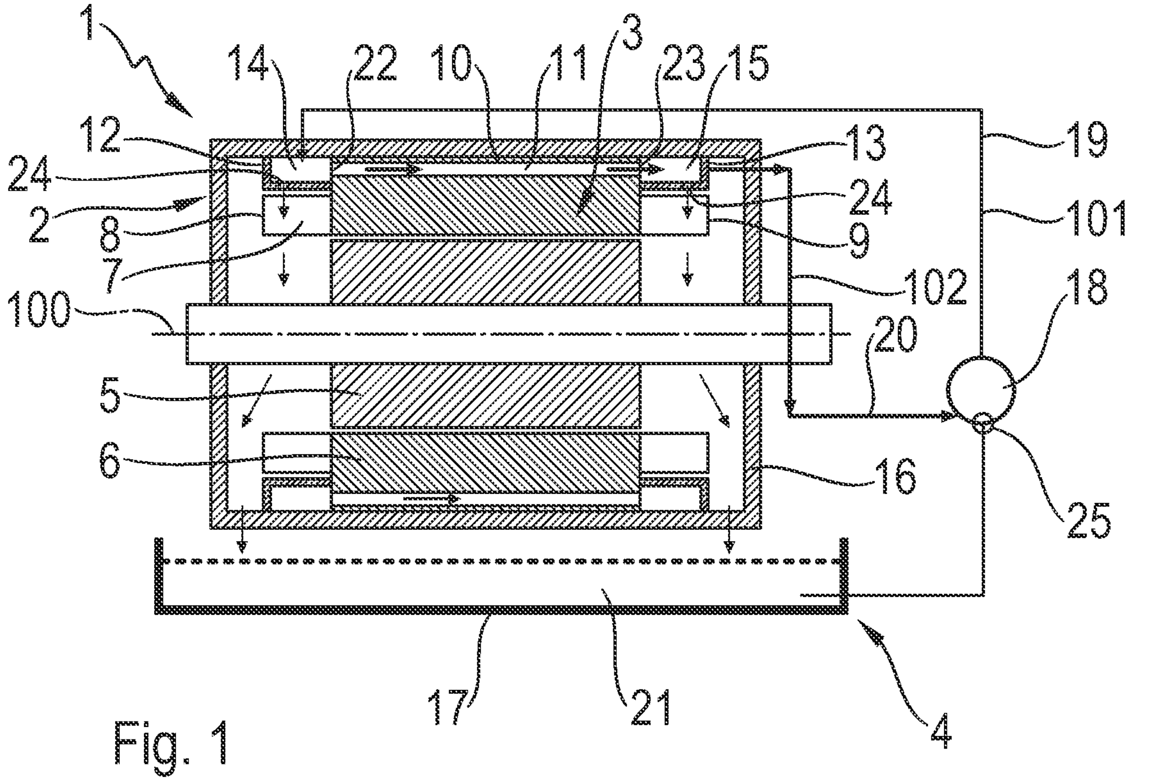
FIG. 1 shows a schematic illustration of an electric machine forming an exemplary embodiment of the invention.

FIG. 1 shows a highly simplified illustration of an electric machine 1 as an exemplary embodiment of the invention. The electric machine 1 is designed and/or suitable for an electric vehicle. When operated as a motor, the electric machine 1 can be used as an electric motor for generating a drive torque, and when operated as a generator, the electric machine 1 can form a generator for generating electricity.

The electric machine 1 contains a stator assembly 2, which comprises a stator 3 and a cooling system 4 for cooling the stator 3. The electric machine 1 also contains a rotor 5, which can rotate in relation to the stator 3 about a main axis 100. The electric machine 1 is designed as an internal rotor machine in which the rotor 5 is located radially inside the stator 3.

The stator 3 is substantially composed of a stator core 6 with numerous stator windings 7 that form protruding winding heads 8, 9 above the end surfaces of the stator core 6.

The cooling system 4 has a cooling shell 10 that is thermally coupled to the stator core 6, formed on a radial outer surface of the stator core 6 such that it encompasses the main axis 100. The cooling shell 10 is formed by way of example by numerous cooling channels 11 running in an axial direction to the main axis 100, which pass through the stator core 6 in the same direction to one another. By way of example, the individual cooling channels 11 can each be formed by axial holes therein.

The cooling system 4 also contains a first and a second coolant guide ring 12, 13, in which the first coolant guide ring 12 is located on a first axial end surface of the stator core 6 to form a first annular channel 14, and the second coolant guide ring 13 is located on a second axial end surface of the stator core 6 to form a second annular channel 15. The two coolant guide rings 12, 13 are coaxial to the main axis 100 and supported axially on the respective end surfaces of the stator core 6 in a liquid-tight manner.

The electric machine 1 has a housing 16 in which the stator 3 and the rotor 5 are housed. The stator 3 can be permanently connected to the housing 16. The annular channels 14, 15 are delimited radially on one side by the respective associated coolant guide rings 12, 13 and on the other side by the housing 16, and axially on one side by the respective associated coolant guide rings 12, 13, and on the other side by the stator core 6. By way of example, the coolant guide rings 12, 13 can have an L-shaped cross section, in which the one leg is formed by a cylindrical shell for delimiting the respective annular channel 14, 15 in the radial direction, and the other leg is formed by a collar for delimiting the respective annular channel 14, 15 in the axial direction. By way of example, the two coolant guide rings 12, 13 can each be made of plastic and/or as identical parts.

The cooling system 4 also has a coolant container 17 and a coolant pump 18, which is connected in the flow path by a supply line 19 to the cooling shell 10 at an intake end. The cooling system 4 also has a return line 20, which is connected in the flow path to the cooling shell 10 at an outlet end.

The coolant container 17 forms a tank in which a coolant in the interior of the housing 16 is contained or collected. In a stationary installation state, a coolant sump 21 is formed in the coolant container 17, and the coolant pump 18 is connected to the supply line 19 such that a portion of the coolant is conveyed from the coolant sump 21 along a supply flow path 101 toward the cooling shell 20 and returned along a return flow path 102 to the supply flow path 101.

The supply line 19 is connected in the flow path to the first annular channel 14, and the coolant is distributed evenly to the cooling channels 11 through the first annular channel 14. The cooling channels 11 each open at a coolant intake 22 into the first annular channel 14, such that the coolant intakes 22 are connected to one another by the first annular channel 14 on the first axial end surface.

The return line 20 is connected in the flow path to the second annular channel 15, and the coolant is removed evenly from the cooling channels 11 through the second annular channel 15. The cooling channels each open with a coolant outlet into the second annular channel 15, such that the coolant outlets 23 are connected to one another by the second annular channel 15 on the second axial end surface.

In the stationary installation state of the electric machine 1, the supply line 19 and return line 20 are connected to an upper surface of the respective annular channels 14, 15. By way of example, the supply line 19 and return line 20 are located opposite one another at a 12 o'clock position, when seen along the circumference, in particular. The return of the coolant can therefore take place at the highest point, thus ensuring that the cooling shell 10 is always full of coolant, and that an optimal flow or heat dissipation of the stator core 6 can therefore be obtained. The uniform flow therethrough is also improved by the two coolant guide rings 12, 13.

The cooling system 4 is also designed to cool the winding heads 8, 9. The two coolant guide rings 12, 13 each have numerous radial holes 24 formed in the cylindrical shell in particular, which are spaced apart evenly along the circumference. The two coolant guide rings 12, 13 thus form a winding head shower, where the first coolant guide ring 12 is located on a radial outer surface of the first winding head 8, and the second coolant guide ring 13 is located on a radial outer surface of the second winding head 9. The holes 24 are each directed radially inward toward the respective winding heads 8, 9, such that they are supplied directly with coolant. By way of example, the holes 24 are designed such that the winding heads 8, 9 are sprayed with a fine mist formed by the coolant. The coolant diverted for the purpose of cooling the winding heads can be subsequently collected in the coolant container 17 and returned to the coolant pump 18.

The size of the holes 24 is such that no more than 30% of the coolant is diverted for cooling the winding heads 8, 9. In other words, if the cooling system 4 has a volumetric flow of 10 liters/minute, then a maximum volumetric flow of 1.5 liters/minute is allowed to flow through the holes in each of the first and second coolant guide rings 12, 13, thus forming a total maximum of 3 liters/minute that is diverted thereto. The remaining coolant can be returned to the cooling system 4 through the return line 20.

As can be seen in FIG. 1, the return line 20 is connected to a point 25 where the coolant pump 18 draws in fluid. The supply flow path 101 therefore runs from the coolant container 17 through the coolant pump 18 and the supply line 19 to the cooling shell 10 and return flow path 102 returns to the coolant pump 18 through the return line 20. By returning the remaining coolant, the pump can draw in coolant at the suction point 25, such that a liquid pressure is generated at this suction point 25 that is at least nearly equal, or equal, to the conveyance pressure generated by the coolant pump 18. By way of example, the coolant pump 18 can be a rotary vane pump. This significantly improves the efficiency of the coolant pump 18. Moreover, the winding head cooling obtained with the coolant guide rings 12, 13 can be set to a minimum, such that the coolant located in the interior of the housing 16, or the machine chamber, is reduced to a minimum. This can reduce the drag torque in the electric machine, in particular when coolant gets into the gap between the stator 3 and the rotor 5, and therefore improve the efficiency of the electric machine 1. This also ensures the reliability of the cooling system 4.

Figure 2:
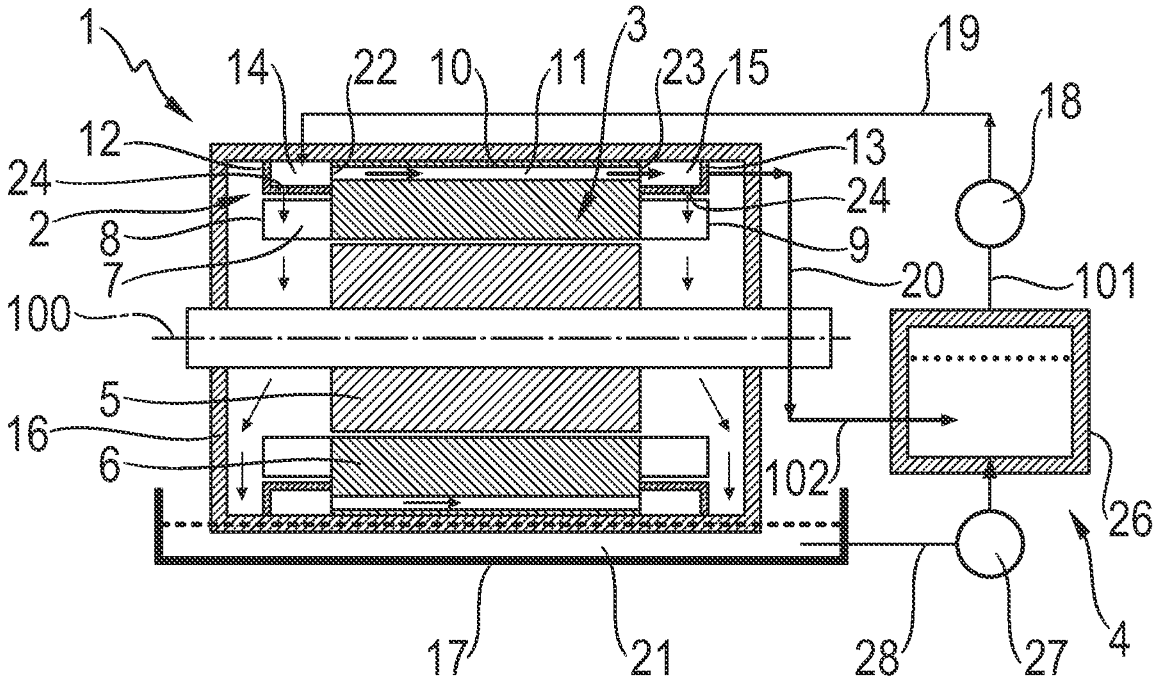
FIG. 2 shows an illustration like that in FIG. 1 of an alternative embodiment of the electric machine.

FIG. 2 shows an illustration like that in FIG. 1 of an alternative embodiment of the electric machine. The electric machine 1 substantially differs from the embodiment shown in FIG. 1 in that there is also a coolant tank 26 in the flow path between the coolant container 17 and the coolant pump 18. The cooling system 4 also has a second coolant pump 27, which is connected to a connecting line 28 in the flow path between the coolant container 17 and the coolant tank 26.

To form a coolant intake, the return line 20 and the connecting line 28 each open into the coolant tank 26, and the second coolant pump 27 is configured to supply the coolant tank 26 with coolant from the coolant container 17. The second coolant pump 27 is formed by at least one bilge pump, by way of example. To form a coolant outlet, the supply line 19 is connected to the coolant tank 26, and the coolant tank 18 is configured to supply the cooling shell 10 with coolant from the coolant tank 26. By returning the coolant directly to the coolant tank 26, the volume conveyed by the second coolant pump 27 is reduced, such that the second coolant pump 27 can be operated more efficiently. Moreover, the coolant is not sloshed around, and cannot be splashed away, thus improving the reliability of the coolant circulation. Furthermore, the coolant supply is ensured independently of the movement of the vehicle.

Figure 3:
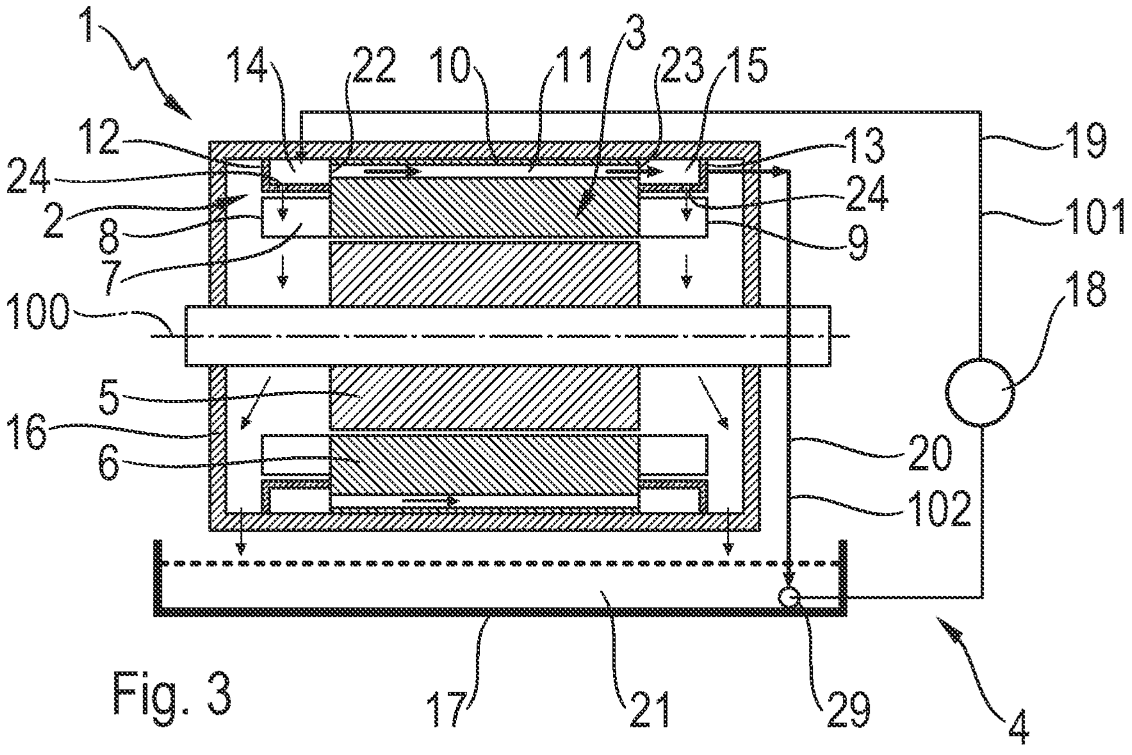
FIG. 3 shows an illustration like that in FIG. 1 of another alternative embodiment of the electric machine.

FIG. 3 shows an illustration like that in FIG. 1 of another alternative embodiment of the electric machine 1. The electric machine 1 substantially differs from the embodiment in FIG. 1 in that the return line 20 opens directly into the coolant container 17, in particular into the coolant sump 21. The coolant in the coolant container 17 can be conducted directly into another suction point 29 in the coolant pump 18, such that the reliability of the circulation can likewise be improved.

Figure 4:
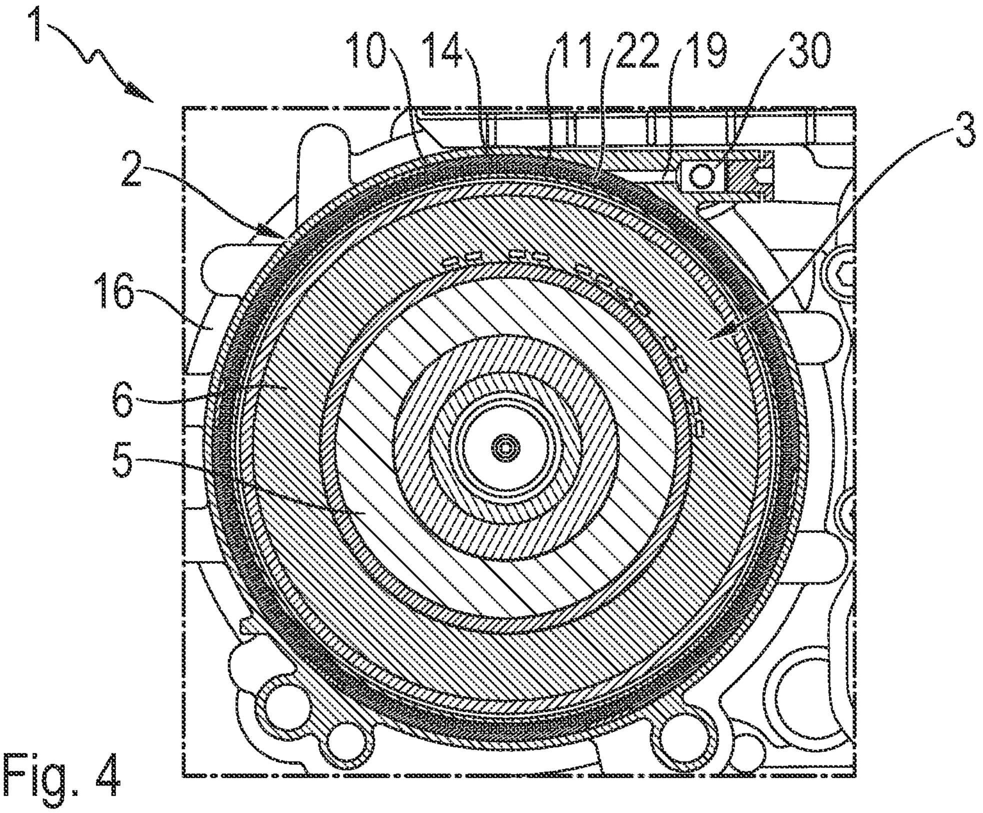
FIG. 4 shows an axial view of the electric machine in a concrete structural embodiment.

FIG. 4 shows the electric machine 1 described above in an axial view, in a concrete structural embodiment. The housing 16 is formed by a cast metal housing, and the supply line 19 is formed at least in part in the housing 16. The supply line 19 can be formed in this case by at least one hole 30 drilled in the housing 16, that opens into the first annular channel 14 at an upper surface of the stator core 6.

Figure 5:
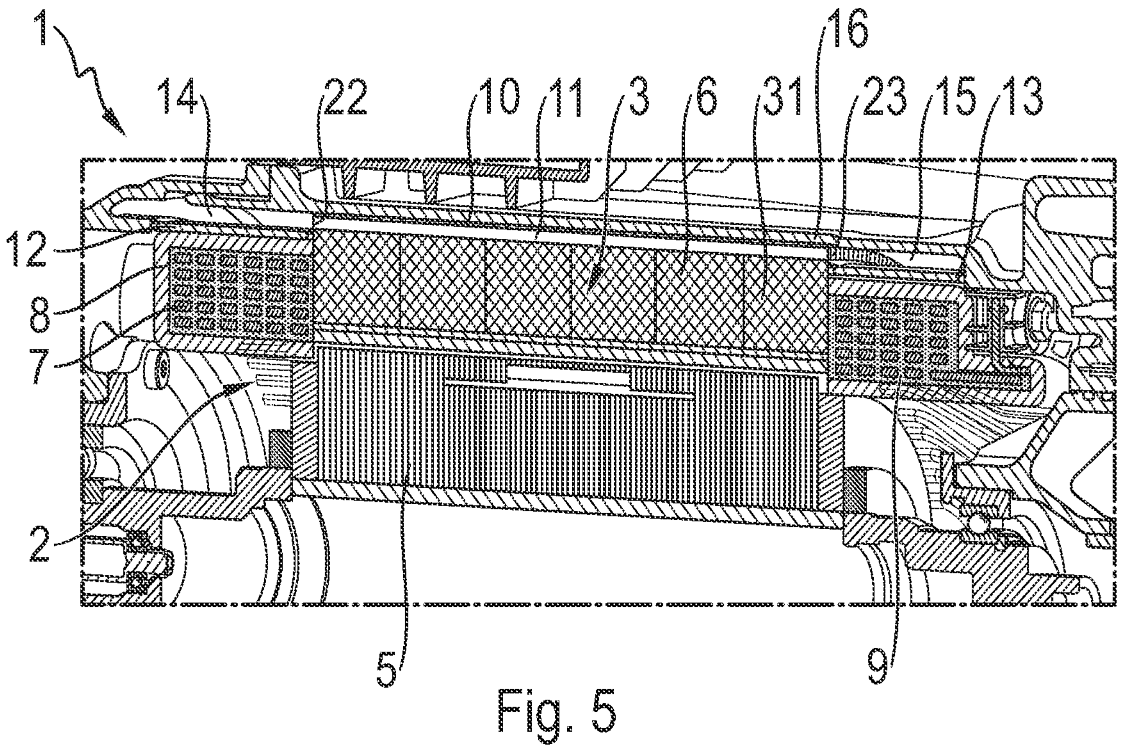
FIG. 5 shows a cutaway illustration of the electric machine shown in FIG. 4.

FIG. 5 shows the electric machine 1 described in reference to FIG. 4 in a longitudinal cut along the main axis 100. By way of example, the stator core 6 is a laminated metal core formed by numerous stator layers 31 laminated in the axial direction. The stator layers 31 have numerous axial holes, for example, that form the cooling channels 11.

The first and second coolant guide rings 12, 13 are formed in this embodiment by cylindrical sleeves, which are supported axially at one side on the end surface of the stator core 6 and at the other side on the housing 16. The two annular channels 14, 15 are therefore formed in the radial direction between the housing 16 and the respective coolant guide rings 12, 13, and in the axial direction between the housing 16 and the stator core 6. The electric machine 1 can consequently be significantly more compact.

Figure 6:
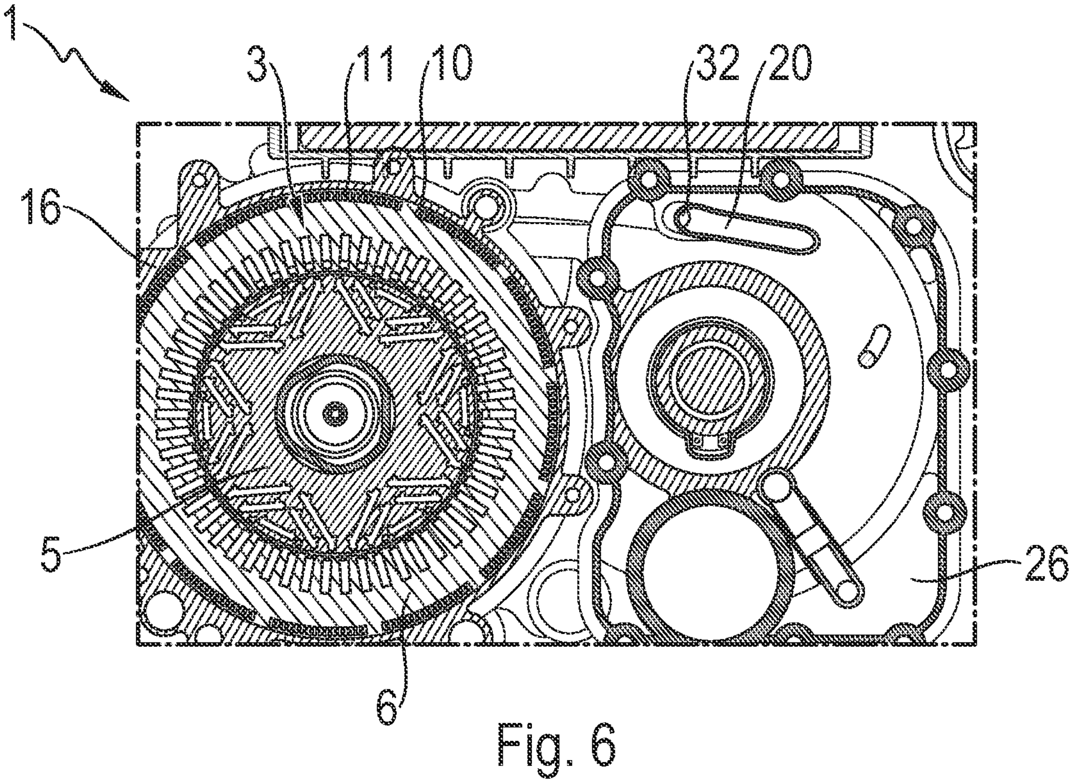
FIG. 6 shows another axial view of the electric machine shown in FIG. 4.

FIG. 6 shows the electric machine 1 described in reference to FIG. 4 in another axial view. The electric machine 1 has the cooling system described in reference to FIG. 2 in this case, in which the coolant tank 26 is adjacent to the machine chamber in the housing 16. The return line 20 is formed at least in part in the housing 16, in that the return line 20 is formed by at least one second hole 32 drilled in the housing 16. The second hole 32 opens into the coolant tank 26, in particular at the top. By integrating the coolant tank 26 in the housing 16, a particularly space-saving electric machine 1 can be obtained.

REFERENCE SYMBOLS

1 electric machine
2 stator assembly
3 stator
4 cooling system
5 rotor
6 stator core
7 stator winding
8 first winding head
9 second winding head
10 cooling shell
11 cooling channel
12 first coolant guide ring
13 second coolant guide ring
14 first annular channel
15 second annular channel
16 housing
17 coolant container
18 coolant pump
19 supply line

20 return line
21 coolant sump
22 coolant intake
23 coolant outlet
24 holes
25 suction point
26 coolant tank
27 second coolant pump
28 connecting line
29 second suction point
30 hole
31 stator laminate
32 second hole
100 main axis
101 supply flow path
102 return flow path

We claim:

1. A stator assembly for an electric machine, comprising:
a housing,
a stator disposed in the housing, the stator having a stator core and stator windings; and
a cooling system for cooling the stator,
wherein the cooling system includes a cooling shell at least partially encompassing the stator core and thermally coupled to the stator core,
wherein the cooling system has a supply line connected to the cooling shell at an intake end and a return line connected to the cooling shell at an outlet end,
wherein the cooling system has at least one coolant pump, and at least one coolant container disposed outside the housing,
wherein the coolant pump is connected to the supply line in a flow path between the coolant container and the cooling shell in order to supply coolant to the cooling shell through the supply line,
wherein the return line is connected in the flow path between the coolant container and the coolant pump such that the coolant pump is supplied with coolant from the return line,
wherein the cooling shell is formed by a plurality of cooling channels that extend in an axial direction of the stator core, wherein the cooling channels are connected to the supply line in the flow path at a first axial end surface of the stator core through a first annular channel, and wherein the cooling channels are connected to the return line in the flow path at a second axial end surface of the stator core through a second annular channel, and
wherein the plurality of cooling channels each are configured to direct a unidirectional flow of the coolant in the axial direction from the first annular channel towards the second annular channel.

2. The stator assembly according to claim 1, wherein a supply flow path runs from the coolant container through the supply line to an intake in the cooling shell, and wherein a return flow path runs from an outlet in the cooling shell through the return line and ends in the supply flow path.

3. The stator assembly according to claim 1, wherein the return line opens into or adjacent to the coolant pump at a suction point.

4. The stator assembly according to claim 1, wherein the cooling system includes a coolant tank that is connected in the flow path between the coolant container and the coolant pump, and wherein the return line opens into the coolant tank.

5. The stator assembly according to claim 4, wherein the cooling system has a second coolant pump, and wherein the second coolant pump is connected to a connecting line in the flow path between the coolant container and the coolant tank in order to supply coolant to the coolant tank through the connecting line.

6. The stator assembly according to claim 1, wherein the plurality of cooling channels each have a coolant intake and a coolant outlet, wherein the coolant intakes are connected to one another in the flow path at the first axial end surface through the first annular channel, and wherein the coolant outlets are connected to one another in the flow path at the second axial end surface through the second annular channel.

7. The stator assembly according to claim 1, wherein the first annular channel is at least partially formed by a first coolant guide ring and the second annular channel is at least partially formed by a second coolant guide ring, wherein the first coolant guide ring is supported on the first axial end surface of the stator core, and wherein the second coolant guide ring is supported on the second axial end surface of the stator core.

8. The stator assembly according to claim 1, wherein the supply line and return line in an intended installation state of the stator assembly are connected to the cooling shell at an upper surface of the stator core.

9. The stator assembly according to claim 1, wherein the supply line and/or return line are formed in the housing.

10. The stator assembly according to claim 1, wherein the stator windings form at least one winding head adjoining the stator core in the axial direction, and wherein the cooling system is configured to cool the at least one winding head.

11. The stator assembly according to claim 10, further comprising a first coolant guide ring and a second coolant guide ring, wherein the first and/or second coolant guide ring has holes distributed over a circumference, such that a portion of the coolant conveyed in the supply line can be diverted toward the at least one winding head through the holes.

12. The stator assembly according to claim 11, wherein the first and/or second coolant guide rings are located on a radial outer surface of the at least one winding head, and wherein the holes are directed radially toward the winding heads to form a winding head shower.

13. The stator assembly according to claim 11, wherein the holes are configured such that no more than 20% of a volumetric flow in the first and/or second coolant guide ring is diverted for winding head cooling.

14. An electric machine that has a stator assembly according to claim 1.

* * * * *